Dec. 19, 1922.
C. A. WOOD.
SPRAYER.
FILED JAN. 10, 1922.
1,439,461.
2 SHEETS—SHEET 2.
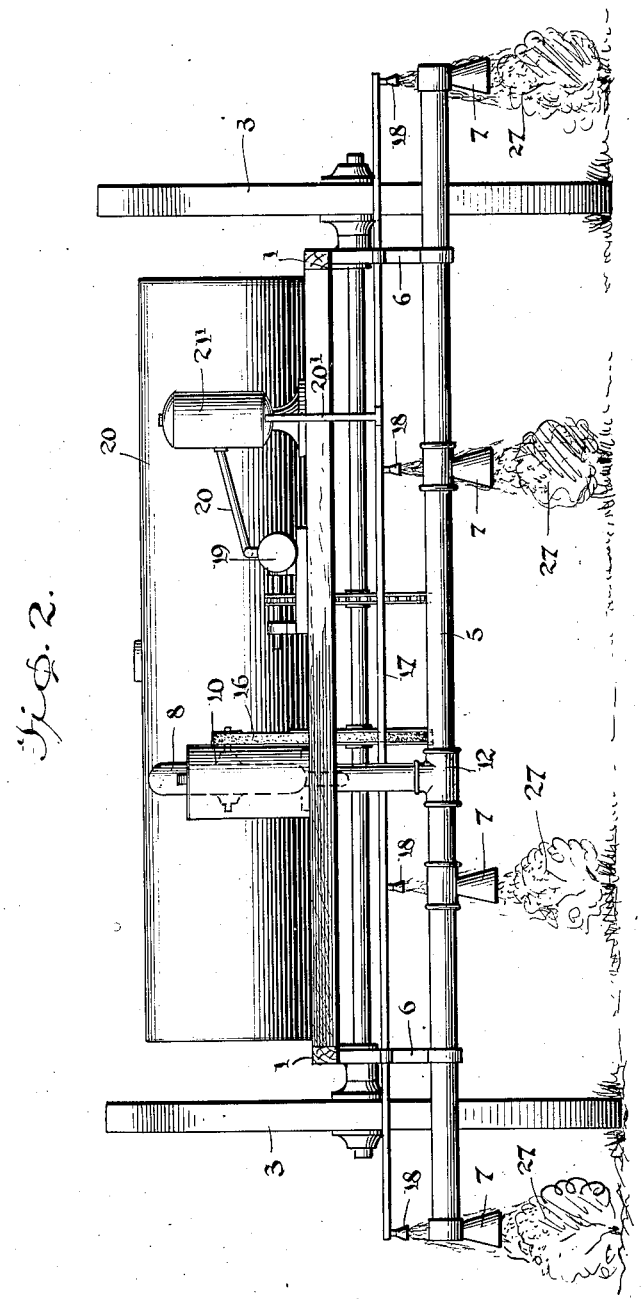
WITNESSES
INVENTOR
C. A. Wood,
BY
ATTORNEYS Patented Dec. 19, 1922.

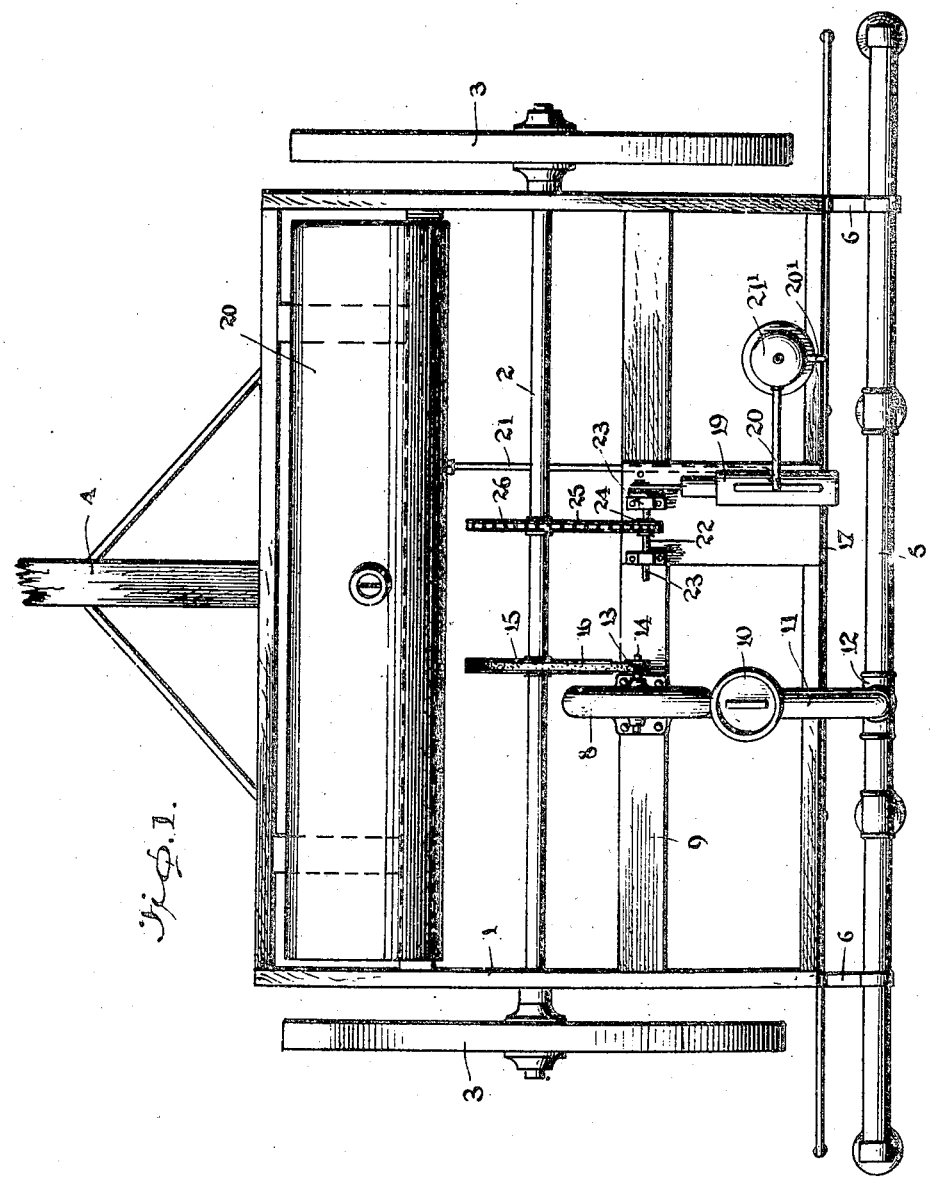

1,439,461

UNITED STATES PATENT OFFICE.

CHARLES AUGUSTINE WOOD, OF ROTHSAY, MINNESOTA.

SPRAYER.

Application filed January 10, 1922. Serial No. 528,270.

*To all whom it may concern:*

Be it known that I, CHARLES AUGUSTINE WOOD, a citizen of the United States, and a resident of Rothsay, in the county of Wilkin and State of Minnesota, have invented certain new and useful Improvements in Sprayers, of which the following is a specification.

My invention relates to improvements in sprayers, and it consists in the combinations, constructions and arrangements herein described and claimed.

An object of my invention is to provide a sprayer having facilities for projecting selected powders and liquids upon the plants to be treated either selectively or simultaneously.

A further object of my invention is to provide a sprayer having means for atomizing the liquid to be sprayed whereby the plants to be treated may be suitably moistened to occasion the adhesion thereto of a powder subsequently or coincidentally cast thereupon.

A still further object of my invention is to provide a sprayer of simplified construction which is strong and durable and thoroughly practical commercially.

Other objects and advantages will be apparent from the following description and the novel features of the invention will be particularly outlined in the appended claims.

My invention is illustrated in the accompanying drawings, forming a part of this application, in which:—

Fig. 1 is a plan view of a practical embodiment of the invention, and

Fig. 2 is a rear view of the same.

In carrying out my invention, I provide a frame which in the drawings is indicated generally at 1 and is shown as being of rectangular conformation but which may be of any suitable form. . Opposite side members of the frame 1 have bearings for a live axle 2 which has ground wheels 3 mounted thereon at its opposite ends. A tongue 4 is attached to the frame 1 to extend forwardly thereof and provides a means whereby the device may be drawn or propelled.

A transversely extending discharge duct 5 is supported at the rear of the frame 1 by means of hangers 6 or the like, whereby the discharge duct 5 is normally maintained substantially horizontal and at a determined height above a surface traversed by the ground wheels 3. The discharge duct 5 is provided at spaced intervals along its length with downwardly extending nozzles 7. A blower fan 8 secured on a transverse frame member 9 is operatively connected with a container 10 which in turn communicates with the discharge duct 5 through a connecting conduit 11 and a suitable pipe fitting, such as a T 12. A pulley 13 secured to the shaft 14 of the fan 8 is arranged to be driven from a pulley 15 secured to the live axle 2 through the medium of a belt 16.

A second discharge duct 17 is supported by the frame 1 in such manner as to be substantially parallel with the duct 5 and positioned slightly in advance of and at a higher level than the latter. The duct 17 is considerably smaller diametrically than the duct 5 and is provided with a plurality of downwardly extending nozzles 18 which correspond in number and arrangement with the nozzles 7 of the discharge duct 5. A pressure pump 19 mounted upon the frame 1 has an intake conduit 21 in communication with a liquid storage tank 20 which is also mounted on the frame. The pump 19, which may be of any suitable known type, is connected with the duct 17 through a delivery tube 20′ which has an air chamber 21′ incorporated therein. When the pump is operated, liquid is forced from the tank 20 to the duct 17 and thence through the nozzles 18. The pump 19 is arranged to be actuated from a shaft 22 journalled in bearings 23 secured on the frame. The shaft 22 has a sprocket 24 secured thereon and is driven by a chain connection 25 with a sprocket 26 secured on the live axle 2.

From the foregoing description of the various parts of the device, the operation thereof may be readily understood. The nozzles hereinbefore mentioned are spaced apart along the discharge duct to position the respective nozzles above rows of plants 27 upon the surface traversed by the ground wheels 3. As stated, the tank 20 is adapted to receive a liquid which may be water alone or any one of various known spraying solutions. Any one of known powders which are beneficial in the eradication of insects, parasitic growths, and the like, which may infest the plants 27, may be placed within the container 10. It will be manifest that when the live axle 2 is rotated, as will be the case when the frame is propelled or drawn over the surface bearing the plants 27, then the fan 8 and the pump 19 will be operated to occasion the discharge of liquid from the tank 21 and powder from the container 10 upon the plants positioned beneath the nozzles 18 and 7. Since the respective nozzles 18 are positioned slightly in advance of the corresponding nozzles 7, the plants will first be sprayed with the liquid and will then receive the powder from the tank 10. In consequence, the plants will be thoroughly moistened and the substance sprayed thereupon in the form of powder will cling to the plants, thus insuring the most beneficial results possible in the service to which the device is applied. Since the liquid and the powder are sprayed upon the same plant by separate means, the liquid discharging nozzles 18 may be of such size as to thoroughly atomize the liquid forced therethrough since there is no possibility that the nozzles will be clogged, as is the case when a mixture of liquid and solid substances or powders, is forced through the same spraying element.

Obviously, either the powder spraying means or the liquid spraying means comprised in the device and hereinbefore described, may be operated independently of each other as well as coincidentally with the other. For instance, powder alone may be sprayed upon the plants if such plants have been moistened by rain or dew.

My invention is susceptible of embodiment in forms other than that illustrated and I therefore consider as my own, all adaptations and modifications of the form of the device herein illustrated and described, which do not depart from the spirit and scope of the invention as disclosed by the foregoing and as outlined in the appended claims.

I claim:—

1. The combination with a vehicle, of a horizontal discharge duct supported thereon, a plurality of downwardly extending nozzles operatively connected with the discharge duct at spaced intervals along its length, a second discharge duct coextensive in length with the first duct and smaller diametrically, said second duct being disposed parallel with the first named duct and slightly in advance of the latter, a plurality of nozzles operatively connected with said second named duct and corresponding in number and arrangement with said first named nozzles, means carried by the vehicle for discharging a powder through said first named duct, and other means carried by said vehicle for discharging a liquid through said second named duct.

2. In combination, a wheeled frame, two discharge conduits supported on the frame in fixed parallel relation in respect to one another and in transversely extending relation to the frame, one of said discharge conduits being smaller diametrically than the other discharge conduit, and being located at a level slightly higher than that of the second discharge conduit, spaced nozzles depending from said discharge conduits, the respective nozzles of the two conduits corresponding in number and relative arrangement, a tank mounted upon the frame and adapted to receive a liquid, a pump having its intake operatively connected with the tank, a delivery conduit connecting the outlet of the pump with the smaller of the two discharge conduits, said delivery conduit including an air chamber, and means connecting with the larger discharge conduit for forcing a dusting powder therethrough.

CHARLES AUGUSTINE WOOD